(12) United States Patent
Booher

(10) Patent No.: US 8,394,226 B1
(45) Date of Patent: Mar. 12, 2013

(54) COMPOSITE FRICTION ELEMENTS AND PULTRUSION METHOD OF MAKING SAME

(76) Inventor: Benjamin V. Booher, Scottsdale, AZ (US)

( * ) Notice: Subject to any disclaimer, the term of this patent is extended or adjusted under 35 U.S.C. 154(b) by 188 days.

(21) Appl. No.: 12/841,657

(22) Filed: Jul. 22, 2010

Related U.S. Application Data

(60) Continuation-in-part of application No. 10/164,191, filed on Jun. 5, 2002, now abandoned, which is a division of application No. 09/492,717, filed on Jan. 27, 2000.

(51) Int. Cl.
 *B29C 65/00* (2006.01)
 *B32B 37/00* (2006.01)
 *B32B 38/04* (2006.01)

(52) U.S. Cl. ........ 156/270; 156/177; 156/178; 156/179; 156/180; 156/256; 523/153; 264/145; 264/153; 264/154; 264/155; 264/156; 264/160

(58) Field of Classification Search .................. 156/256, 156/270, 516, 517, 177, 178, 179, 180; 188/251 A; 264/145, 153, 154, 155, 156, 157, 160
See application file for complete search history.

(56) References Cited

U.S. PATENT DOCUMENTS

| 5,156,787 | A | * | 10/1992 | Booher | 264/135 |
| 5,690,770 | A | * | 11/1997 | Booher | 156/177 |
| RE36,705 | E | * | 5/2000 | Booher | |

* cited by examiner

*Primary Examiner* — Linda L Gray
(74) *Attorney, Agent, or Firm* — Booth Udall Fuller, PLC

(57) ABSTRACT

A composite friction unit of a three dimensional composite body is formed of a substantially uniform array of predominately glass strands of primary reinforcing fibers in matrix of phenolic resin material, the reinforcing fibers in the form of fabric distributed throughout the body forming a friction unit having a predetermined size and configuration and uniform distribution and alignment of fibers throughout. An alternate friction unit includes a substantially rigid or rigid backing co-pultruded in forming the unit. The units are produced in a pultrusion process wherein the reinforcing fibers and matrix are pulled through a forming die.

10 Claims, 6 Drawing Sheets

COMPOSITE FRICTION ELEMENTS AND PULTRUSION METHOD OF MAKING SAME

CROSS REFERENCE TO RELATED APPLICATIONS

This application is a continuation in part application to earlier U.S. patent application Ser. No. 10/164,191 entitled "Pultrusion Method of Making Composite Friction Members" to Booher, filed Jun. 5, 2002, now abandoned, which was a divisional application to U.S. patent application Ser. No. 09/492,717 entitled "Composition Friction Members and Pultrusion Methods of Making Same" to Booher, filed Jan. 27, 2000.

BACKGROUND OF THE INVENTION

The present invention relates to composite friction elements for brakes and clutches and pertains particularly to improved friction elements, composition and method for making same.

A friction brake is basically a pair of friction members, one rotating and one stationary, brought into engagement to produce a friction force measured as brake torque for either slowing or stopping the rotating element. Brakes are preferably designed so that the brake torque is somewhat proportional to the input force used to engage the elements and the energy of the rotating member is dissipated in the form of heat. Unfortunately, pressure is not the only factor that influences the frictional response of the brake elements. Friction effects between friction elements cause friction force and brake torque to vary with engaging pressure, speed, and temperature, and to depend upon deposited interfacial film for stability. Nevertheless, brakes are preferably designed so that the brake torque is reasonably proportional to the input force used to engage the elements. The energy of braking is dissipated in the form of heat through the brake elements. For this reason they must be able to withstand a great deal of heat for most applications.

The rotating element of a brake system is usually a disc or drum made of metal such as a steel, and the stationary element is usually a composition pad or shoe lining moveable into and out of engagement with the rotating element. The composition element is designed to wear without undue wear of the metal disc or drum. The materials forming the composition element are the principle unpredictable variables that have the greatest affect on the performance characteristics of the brake system. Desirable materials for the composition element must be safe to use, relatively inexpensive, have good friction, wear and heat performance characteristics. This includes good fade resistance, or the ability to maintain good (preferably substantially uniform) braking with heat buildup.

A friction clutch is similar in some respects to a brake and is basically a pair of friction elements designed to selectively couple a rotating driving element to a driven element to bring the driven element up to speed to rotate with the driving element. The clutch elements, both rotating with one driving and one driven, are brought into engagement to produce a friction force driving torque for bringing either a slow moving or a stationary element up to speed with a rotating driving element. The clutch usually consists of a circular friction plate or disc having friction pads or elements of composition material on both faces squeezed between a pair of metal pressure plates.

Until recent years, the predominant reinforcing material used in the manufacture of friction pads and discs for brakes, clutches and the like was asbestos. These pads were manufactured by a molding process where each unit was formed of a composition of randomly oriented asbestos fibers in a bonding matrix placed under pressure in a mold cavity. However, it was discovered that asbestos is a carcinogenic substance, and that such use released potentially harmful amounts of it into the environment. For this reason, some industrialized countries prohibit the use of asbestos friction materials, and others including the United States require the use of asbestos to be phased out over the next few years. Therefore, there exists an urgent need for safe and effective friction materials and economical methods of manufacturing the materials into suitable friction units.

Extensive efforts have been put forth in recent years in an effort to find suitable environmentally safe materials and compositions having the desirable wear, heat and other characteristics to serve as a substitute for asbestos as friction elements in brakes and clutches. These efforts have been frustrated by the many and varied parameters involved, including the range of needs to be met between brakes and clutches as well as different types of brakes and different types of clutches. For example, different size vehicles require different size friction pads for both brakes and clutches and often have other variables including higher operating forces and temperatures. Brake pads used with rotating discs have different conditions than shoes used with brake drums. Also clutches used with automatic transmissions have different conditions from clutches used with manual or stick shift transmissions.

Attempts to satisfy the need for long life, high friction heat resistant friction materials have included proposals to utilize various chopped fibers molded in a bonding matrix, such as a resin. The friction unit is formed in the traditional fashion by a molding process, with the fibers and other components randomly oriented and placed in a binder, such as either a dry powder resin cured under heat and pressure, or placed in a liquid resin in a mold and cured. Examples of these compositions and manufacturing methods are disclosed in U.S. Pat. No. 4,119,591, granted Oct. 10, 1978 to Aldrich, U.S. Pat. No. 4,259,397, granted Mar. 31, 1981 to Saito et al., and U.S. Pat. No. 4,432,922, granted Feb. 21, 1984 to Kaufman et al.

However, friction units made by this method are expensive to manufacture and have not been satisfactory, because of their lack of uniformity in performance and durability. For example, units from the same batch may vary as much as 35% in performance characteristics. The non-uniformity of results has been found to be caused largely by a non-uniformity of distribution and orientation of the fiber and other components in the matrix. This not only creates expensive inspection and quality control problems, it can also create maintenance problems, and sometimes even hazardous conditions. For example, pads that have been matched for performance at initial installation may vary over their useful life.

Throughout the past several years, the applicant has developed extensive improvements in compositions and structures as well as in pultrusion methods of manufacture of composite friction elements for brakes and clutches. Many of these improvements are embodied in the applicants U.S. Pat. Nos., 5,156,787, entitled "PULTRUSION METHOD OF MAKING BRAKE LININGS"; 5,462,620, entitled "CONTINUOUS PULTRUSION METHOD OF MAKING FRICTION UNITS"; 5,495,922, entitled "UNIFORM COMPOSITE FRICTION UNITS; and 5,690,770 entitled "PULTRUSION METHOD OF MAKING COMPOSITE FRICTION UNITS. However, the applicant's continuous work on perfecting these compositions, structures and methods indicate that further improvements in both compositions and methods of manufacture are desirable and consequently have been developed by the applicant. For example, improved mechanical properties, compositions and structures were developed as well as improvements in pultrusion manufacturing methods.

Now then, further improvements are desirable in compositions, structures and methods of manufacture. Accordingly, it is desirable that improved compositions, structures and methods of manufacture be available to overcome the above and other problems of the prior art.

SUMMARY OF THE INVENTION

It is the primary object of the present invention to provide improved compositions, structures and methods of manufacturing friction linings for brakes and clutches of all types. Another object of the present invention is to provide improved pultrusion process for the manufacture of friction linings for brakes and clutches. Another object is to provide a means for co-manufacturing friction units with backing structure by single process.

In accordance with a primary aspect of the present invention, friction units are manufactured by a pultrusion process and comprise a composition of a controlled density and orientation of an array of primary reinforcing fibers in a phenolic resin with selected minor quantities of one or more of organic and inorganic friction modifiers.

Another aspect of the invention includes friction units made by a continuous process comprising the steps of selecting a uniform array of primary strands of reinforcing fibers impregnated with a phenolic resin material into which certain friction modifiers and process agents have been mixed, pulling the impregnated strands of reinforcing fibers through a composite forming die for forming a body having at least a portion of the three dimensional configuration of the friction units, and selectively cutting the body into a plurality of the friction units.

Another aspect of the invention includes friction units made by a continuous process comprising the steps pulling the impregnated strands of reinforcing fibers through a composite forming die together with a panel of a secondary material in a co-process to provide for an integral backing or reinforcement portion to the friction unit.

BRIEF DESCRIPTION OF THE DRAWINGS

The above and other objects and advantages of the present invention will become apparent from the following description when read in conjunction with the accompanying drawings wherein.

DETAILED DESCRIPTION

The present invention is directed to improvements in a process known as pultrusion for the production of articles from composite materials. The pultrusion process is a process wherein products or articles are formed in a die by pulling the materials through the die where they are shaped as to at least one significant dimension or configuration in the process. This distinguishes over the extrusion process wherein materials are forced or pushed through a die under pressure and alternative processes whereby products are molded individually in pressure cavity dies.

Figure 1:
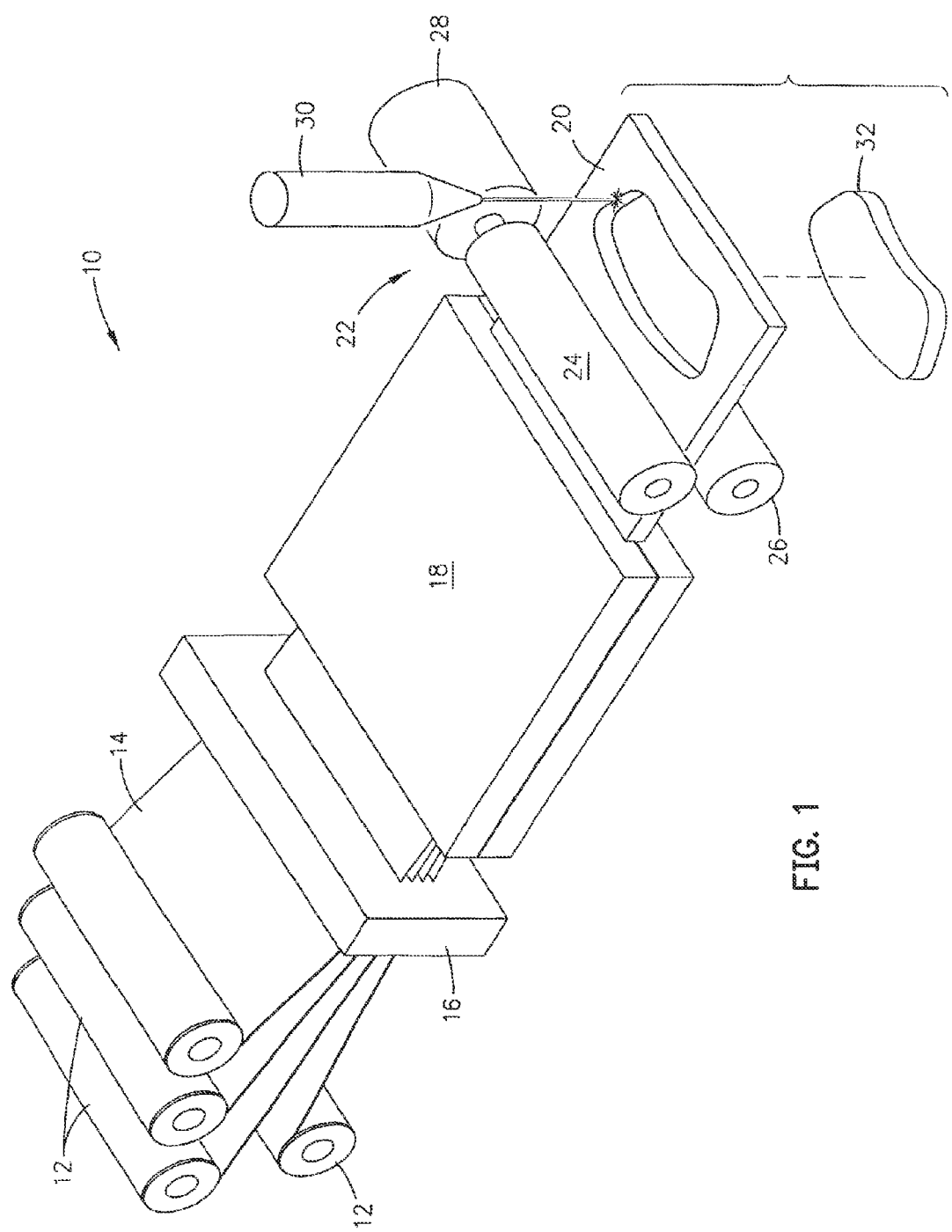
FIG. 1 is a perspective view schematically illustrating an apparatus and a preferred method of carrying out the invention.

Referring to FIG. 1 of the drawing, there is schematically illustrated an exemplary system for carrying out an exemplary series of steps of producing linings for brakes and clutches in accordance with the invention. The system, designated generally by the numeral 10, comprises source of reinforcing fiber or fabric such as one or more spools or rolls 12 from which a panel 14 of a plurality of strands of an elongated continuous fiber or arrays of fiber are drawn. The panels or arrays of fibers are impregnated with a suitable resin such as by being passed through suitable injection chamber or wetting bath 16 of a suitable resin such as a phenolic resin and through a forming die 18 from which a composite panel 20 emerges.

The panels of reinforcing fibers are pulled through the die 18 by suitable pulling or traction means 22 such as a roller traction device as illustrated. The illustrated traction device comprises a pair of rollers 24 and 26 between which the panel 20 passes and is gripped it and is pulled through the die. The rollers may be driven by a suitable motor 28 which may be powered by any suitable means such as electric, air, hydraulic and other suitable power means. Other types of traction devices such as air or hydraulic powered reciprocating pulling grippers or tractors (not shown) may also be used. After the panel has emerged from the die the desired shape parts are cut from it by any suitable cutting means 30 such as a water jet, abrasive cutter, laser, plasma, stamping or other means.

As illustrated in FIG. 1, the emerging panel 20 is cut into brake pads of suitable, such as, an arcuate configuration. This cutting may be accomplished by any suitable cutting means such as a water jet, abrasive cutter, laser, plasma, stamping or other means. The cutting process will depend to an extent on the thickness and content of the material. Relatively thin materials, such as for small brake pads and clutch plates, may be cut by stamping with a die cutter or other suitable means. Certain clutch plates and abrasive discs for various applications may be as thin as a single layer of woven reinforcing fibers. Thicker materials such as for heavy duty brake pads and shoes will require other cutting means such as water jet or the like.

Figure 2:
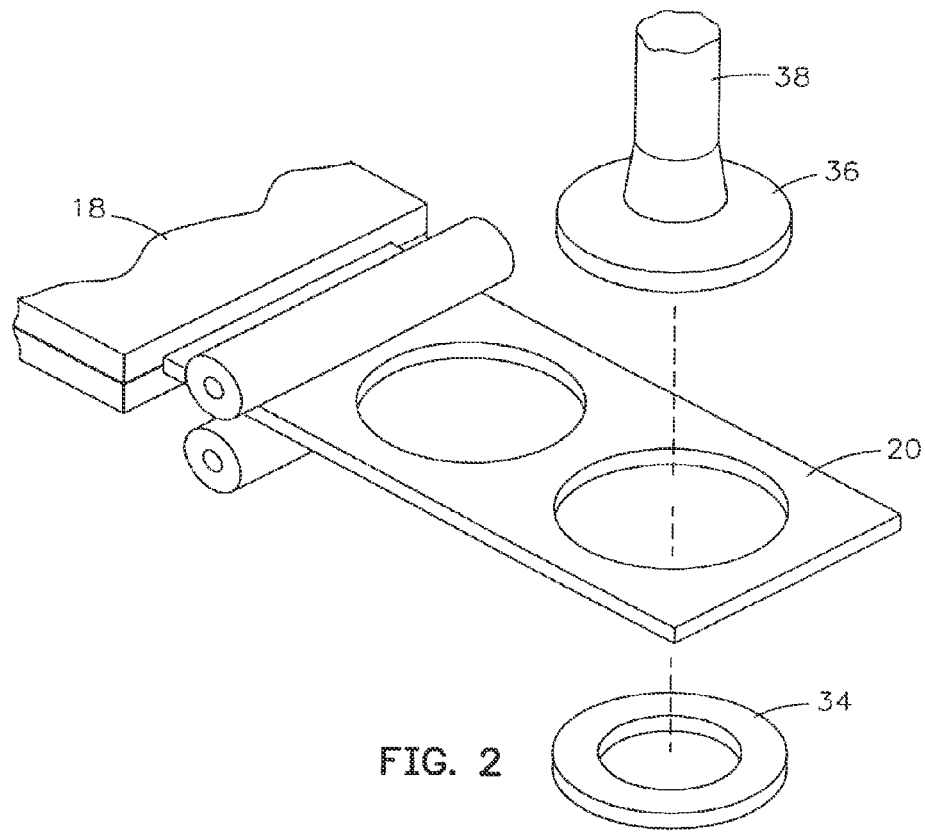
FIG. 2 is a view like FIG. 1 illustrating the method of making clutch linings in accordance with the invention.

As illustrated in FIG. 2, the emerging panel 20 may be cut into clutch pads or discs of a ring or annular configuration. This cutting may be accomplished by means of a die cutter 36 powered by an air or hydraulic cylinder 38. Because the materials are relatively thin such as for clutch plates, they can be easily cut by stamping with a die cutter. Clutch plates for some applications such as in automatic transmissions maybe as thin as a single layer of woven reinforcing fibers and may include an integral backing or reinforcement portion.

The combination of fibers and resin are shaped at least as to certain dimensions and configurations of portions of the articles in the die and cured by heat prior to emerging from the die. In the illustrated embodiment, a generally flat rectangular panel 20 is formed from which brake or clutch pads 32 are cut or stamped. This is a continuous process forming at least some portions and dimensions such as the thickness and friction surface of an article of manufacture. The fibers may be in the form of individual strands, woven fabrics, matting, or stitched fabrics or combinations of them. However, a preferred form of the reinforcing fibers is in a woven panel or matting wherein the primary fibers are in the machine direction and cross woven fibers are at right angles to the primary fibers or strands. The cross fibers may in some cases be alternately in other than ninety degrees (90) to the primary fibers.

Figure 3:
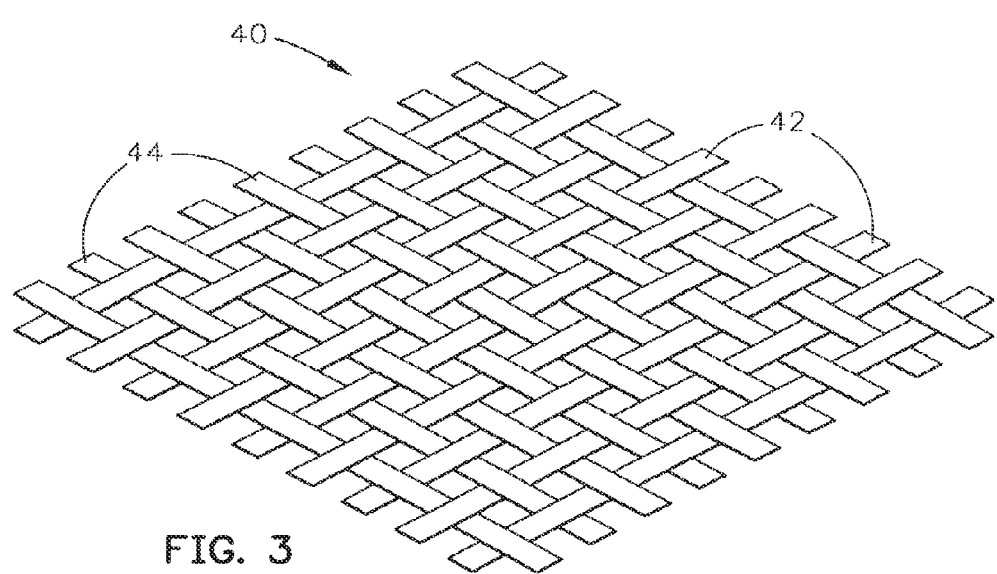
FIG. 3 is a perspective view of a typical woven panel of reinforcing fibers in accordance with the invention.

Referring to FIG. 3, an exemplary preferred reinforcing panel is illustrated and designated generally by the numeral 40. The panel is shown as a traditional weave of fibers 42 which may be primary fibers extending in the machine or pull direction. Cross fibers 44 which may be considered secondary fibers extend substantially ninety degrees across the fibers 42 in a traditional weave. The illustrated fibers 42 and 44 may be a single strand or fiber or may be a string of multiple fibers of the same or different kind. The primary reinforcing fibers 42 and 44 for the brake pads or linings are preferably glass fiber, but the pad may contain other materials and fibers or combinations thereof. In addition, other fibers may be woven or distributed in with the glass fibers in various selected distributions and proportions to alter and or enhance certain characteristics. For example, various fibers may be distributed in various concentrations substantially uniformly throughout the unit for optimizing various parameters such as inner laminar shear strength, wear, fade, and cooling. The addition of secondary reinforcing fibers can be accomplished in several different ways.

Many different fibers or strands and combinations may be utilized, including but not limited to glass, rock, ceramic, carbon, graphite, aramid, nomex kevlar, wool and cotton fibers of other organic and inorganic materials. Various metallic fibers such as copper and aluminum, may also be utilized in various proportions with non-metallic fibers. In one preferred composition, the fibers amount to are about 20% to 60% by weight. Optic fibers may also be included in order to provide active test and performance monitoring of the finished parts for evaluation or end use purposes.

The manufacturing system and process, as illustrated, provides for the controlled predetermined orientation of the primary fibers, as well as the controlled predetermined uniformity and density of the primary fibers within the resin matrix. For example, the composition of the friction device determines many of its characteristics, such as its durability, heat resistance, and friction resistance. With this process, the primary fibers may be controllably distributed and oriented uniformly at any suitable angle to the friction surface of the brake pad or friction device. Thus, the process and materials have the capability of providing superior, predictable and consistent performance.

The process may include the addition of secondary fibers that extend transverse to the primary fibers in order to add shear strength and other mechanical properties to the units. In one form of the process, as The panels 16 of fibers or strands are coated or wetted by a resin in any suitable manner either prior to (pre-preg) or during the pultrusion process. In the illustrated embodiment the fibers are shown to pass into or through a bath or injector chamber 16 of a suitable liquid resin contained within a reservoir 20 for wetting or impregnating the fibers or strands. The fibers can also be impregnated with resin prior to process (pre-preg) or they may be wetted by resin injection or other suitable means during the pultrusion process or as by drawing them through a bath or by pumping resin into them from a header that surrounds the rovings or panels of fibers. The fibers will in reality number in the hundreds or thousands, preferably in a matting of fibers in several rows many of which may be parallel and stitched together or interleaved with other layers of different orientation. In the illustrated preferred system, the fibers are in the form of woven panels or mats formed or cut to the width of the die and guided through into the die 18 for imparting at least a part of the final shape or configuration of the friction units.

The strands, particularly if glass fibers, may require a sizing treatment, i.e. application of a compound or chemical to insure a good or complete wetting of the fibers and a good bond between the fibers and matrix and between layers of fibers. A bulked roving (bunch of strands or fibers) is preferably used. Bulked roving is produced by a process in which a standard roving is fractured or splintered by forced cold air. This provides two useful properties, 1) increased diameter which assists in providing fill to low glass content pultrusion, and 2) the "splinters" provide for good mechanical bonding in all axis within the resin matrix.

The resin impregnated or wetted panels of fibers are passed or pulled through the die 18, where they are shaped into at least part of the desired configuration and are at least partially, if not fully, cured. The fiber and resin composition is preferably at least partially cured in the die by any suitable means such as exothermic or radiant heat or other means, and the fibers will thereby be put in and remain in tension in the body of the unit. The composite unit emerges, or more particularly is pulled in tension from the die in the form of an elongated continuous bar or panel 20 having at least part of the peripheral configuration of the brake or clutch pad or other article being manufactured. In the case of brake and clutch pads, the bar or panel preferably has the friction and mounting surface configuration of the final pad. The bar or panel 20 is pulled from the die 18 by suitable means, such as hydraulic pullers, tractors (not shown) or the like, and positioned to be cut into individual friction or brake pad units or pieces in the illustrated embodiment. The pultrusion process provides a substantially controlled composition with predetermined distribution and orientation of the primary fibers throughout the body of the friction unit. This helps in maintaining a high degree of uniformity among the units as well as in the various parameters of the units and their end performance.

It may be desirable in some instances to provide a different angularity to the fibers in relation to the friction surface. For example, it may be desirable to have the fibers at an angle to the friction surface of up to as much as forty five degrees. This can be accomplished by cutting the friction units from the bar at the desired angle to the axis thereof.

The brake pads, upon being cut from the panel, may be placed on a conveyer belt or otherwise moved into position for further processing such as attachment to a backing plate. The pads or linings may be attached such as adhesively bonded to a backing plate or shoe. The pads are then accumulated by suitable manner in a suitable storage container or bin where they are then packaged and shipped. This provides a highly efficient and economical manufacturing process compared to traditional process techniques.

The density and mixture of primary fibers as well as secondary fibers may be varied to suit the particular application. Specifically, in the case of brake shoes, however, the orientation of the primary fibers may be in a drum transverse to the drum surface. The fibers are pulled through a die having the curve or arc of the desired shoe and selectively cut widthwise. In this application the cut surface does not represent the friction surface. A secondary preparation step, such as grinding, may be performed to attain the desired surface. This is also true for various pad and clutch applicators as described herein.

While brake pads are illustrated in the process, it is apparent that clutch friction units and brake shoe linings as well as abrasive friction discs may also be manufactured by this process. The die is set to shape one peripheral surface or outline of the emerging articles and can include annular shapes. Otherwise, the die can be set to provide at least one dimension of the article to be manufactured. In the case of pads for disc brakes, in one embodiment the fibers are oriented uniformly at an angle preferably normal to the friction surface for the highest efficiency of manufacture. However, in certain applications, an orientation parallel to the friction surface may be satisfactory or even preferred for manufacturing as well as performance.

The shoe linings may be formed by the pultrusion process in the form of a thin arcuate slab, and the linings cut to width as described above with respect to pads. This provides an economical technique for producing consistently uniform units. However, where orientation of the fibers normal to the friction surface is desired, a rectangular slab may be cut along an arc to form the curved friction surfaces.

The articles may be cut from the pultruded bar by any suitable means, such as by laser, water or other means. The present method and process provides a highly efficient manufacturing process for the production of high quality friction units that are asbestos free and/or a controlled uniform composition and quality. The pultrusion process enables rapid production and the careful control of fiber density filler and friction formulation, mixture, and orientation on a continuous basis.

The primary reinforcing fibers 14 for the brake pads or linings are preferably glass fiber, but the pad may contain other materials and fibers or combinations thereof. In addition, other fibers may be woven or distributed in with the glass fibers in various selected distributions and proportions to alter and or enhance certain characteristics. For example, various fibers may be distributed in various concentrations substantially uniformly throughout the unit for optimizing various parameters such as inner laminar shear strength, wear, fade, and cooling. The addition of secondary reinforcing fibers can be accomplished in several ways. Many different fibers or strands and combinations may be utilized, including but not limited to glass, rock, ceramic, carbon, graphite, aramid, nomex, wool and cotton fibers of other organic and inorganic materials. Various metallic fibers such as copper and aluminum may also be utilized in various proportions with non-metallic fibers.

Figure 4:
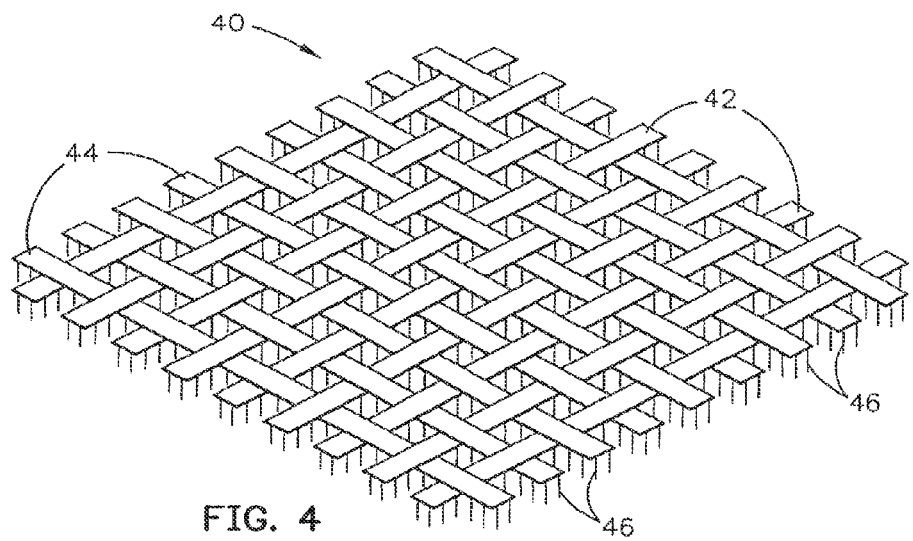
FIG. 4 is a view like FIG. 3 illustrating the woven panel of FIG. 3 following a needling treatment for carrying out a step of a preferred method of the invention.
Figure 5:
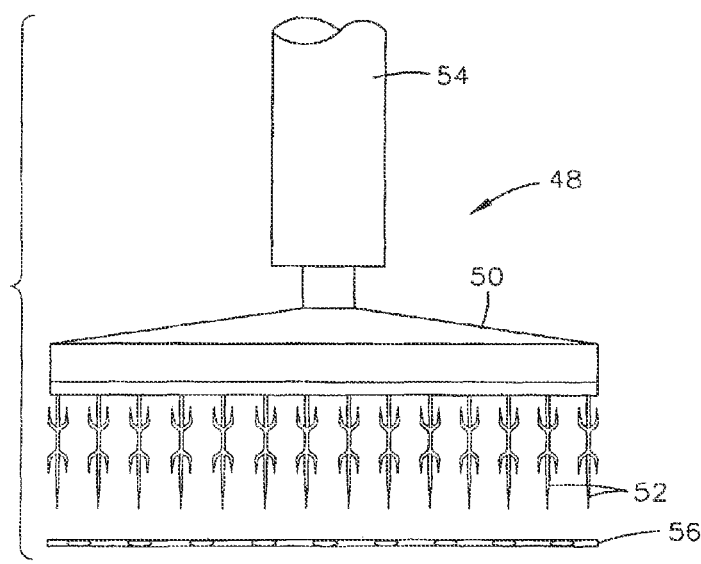
FIG. 5 is an elevation view illustrating a needling of multiple panels of reinforcing panels.

The illustrated preferred process utilizes multiple layered fabric panels of reinforcing fibers. In some instances additional shear strength may be required between the layers of reinforcing fibers. One preferred method of obtaining sufficient strength is by the method of needling as illustrated in FIGS. 4 and 5. This process comprises passing multiple barbed needles down through the panel of fibers as the panel passes beneath the needles. As shown, the panel 40 has portions or strands of fibers 46, referred to herein as downturns, extending down from the panel. Similar strands of fiber may also extend upward if desired. In a preferred method several layers of the reinforcing panels come together and thereby co-mingle their respective needled portions resulting in a joining or stapling the woven panels together. Fibers from each panel are forced into adjacent panels resulting in a high strength mechanical bond between adjacent panels. This improves bonding between the layers and inner layer shear strength in the final product and helps to limit distortion caused by the pulling forces of pultrusion.

An exemplary apparatus for carrying out this needling procedure is illustrated in FIG. 5 and designated generally by the numeral 48. The apparatus comprises a support 50, which is preferably in the form of a generally rectangular panel, on which is mounted an array of a plurality of barbed needles 52. A reciprocating power unit 54 such as a hydraulic or pneumatic cylinder is connected to the support 50 and moving it upward and downward to force the needles through one or more layers or panel 56 of reinforcing fibers forming upturns and downturns as may be specifically desired. This array of upturns and downturns tend to tie the panels together once in contact with each other during processing to improve the internal or inner laminar shear strength of the final product.

Figure 6:
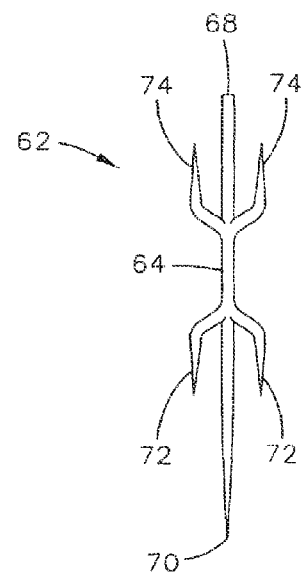
FIG. 6 is an elevation view illustrating a needle for use in the operation of FIG. 5.
Figure 7:
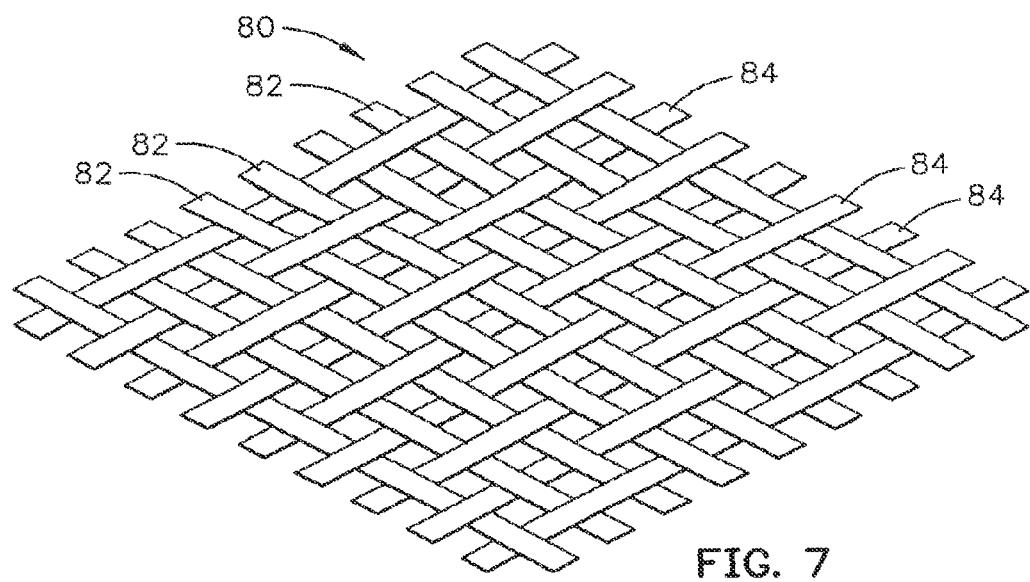
FIG. 7 a view like FIG. 3 illustrating an alternate embodiment of a woven panel for carrying out a preferred method of the invention.
Figure 8:
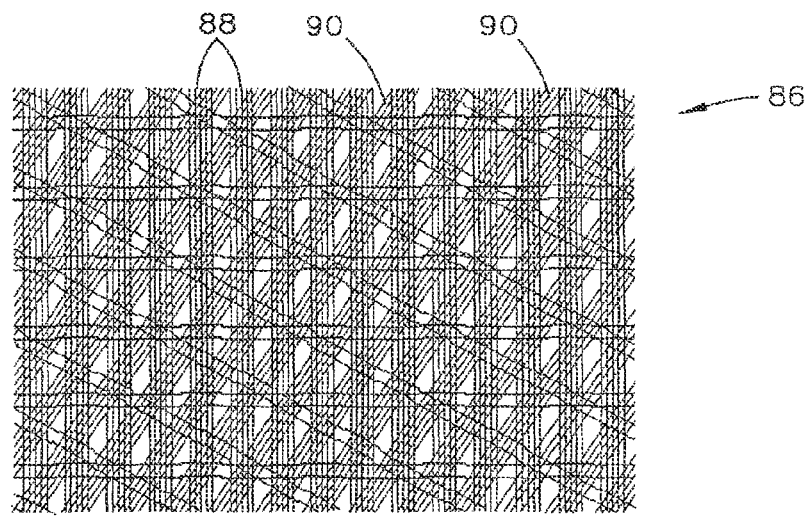
FIG. 8 is a plan view of a typical stitched panel of reinforcing fibers in accordance with the invention and FIG. 9 is a plan view of a typical braded panel of reinforcing fibers in accordance with the invention.
Figure 9:
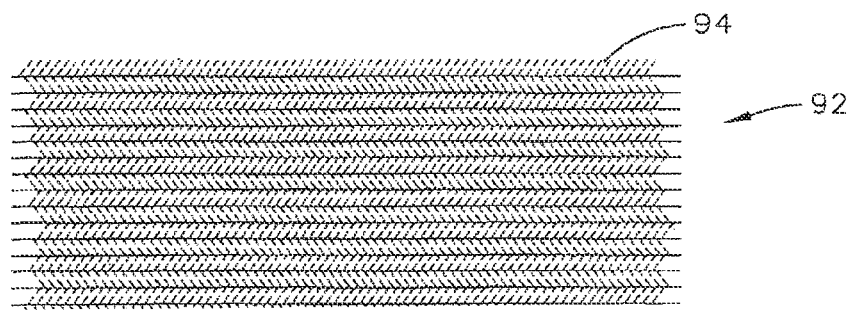

Referring to FIG. 6, an exemplary embodiment of a needle is illustrated and designated generally by the numeral 62. The needle 62 comprises an elongated shank 64 having a mounting end 68 and a pointed end 70. A pair of downturned barbs 72 are formed on a lower portion of the shank pointing in the direction of the needle point. A pair of upturned barbs are formed on the shank: above the down turned barbs and point toward the mounting end of the needle. The panels of matting may also be formed in any number of other ways such as illustrated in FIGS. 7, 8 and 9. Referring first to FIG. 7, a panel 80 is formed of woven fibers or strands which cross in the traditional manner. However, pairs of strands 82 extending in one direction are woven into single cross strands 84. Illustrated in FIG. 8 is a mat 86 formed of a plurality of bundles of fibers 88 (vertically oriented) secured together by stitching 90 (extending horizontally). A second panel of these is shown layered at an angle of about forty five degrees. These may be layered in many different angles from a few degrees up to 90 degrees.

FIG. 9 illustrates a braided mat 92 formed by braiding multiple strings or bundles 94 of fibers. The braiding may be relatively loose or tight as desired. Layers of these and the FIG. 8 mats or panels may also be needled for further composite reinforcement. In addition the reinforcing of a run of composite units may utilize layers of anyone or combinations of two or all of these mats or panels of fibers.

Figures 10, 11:
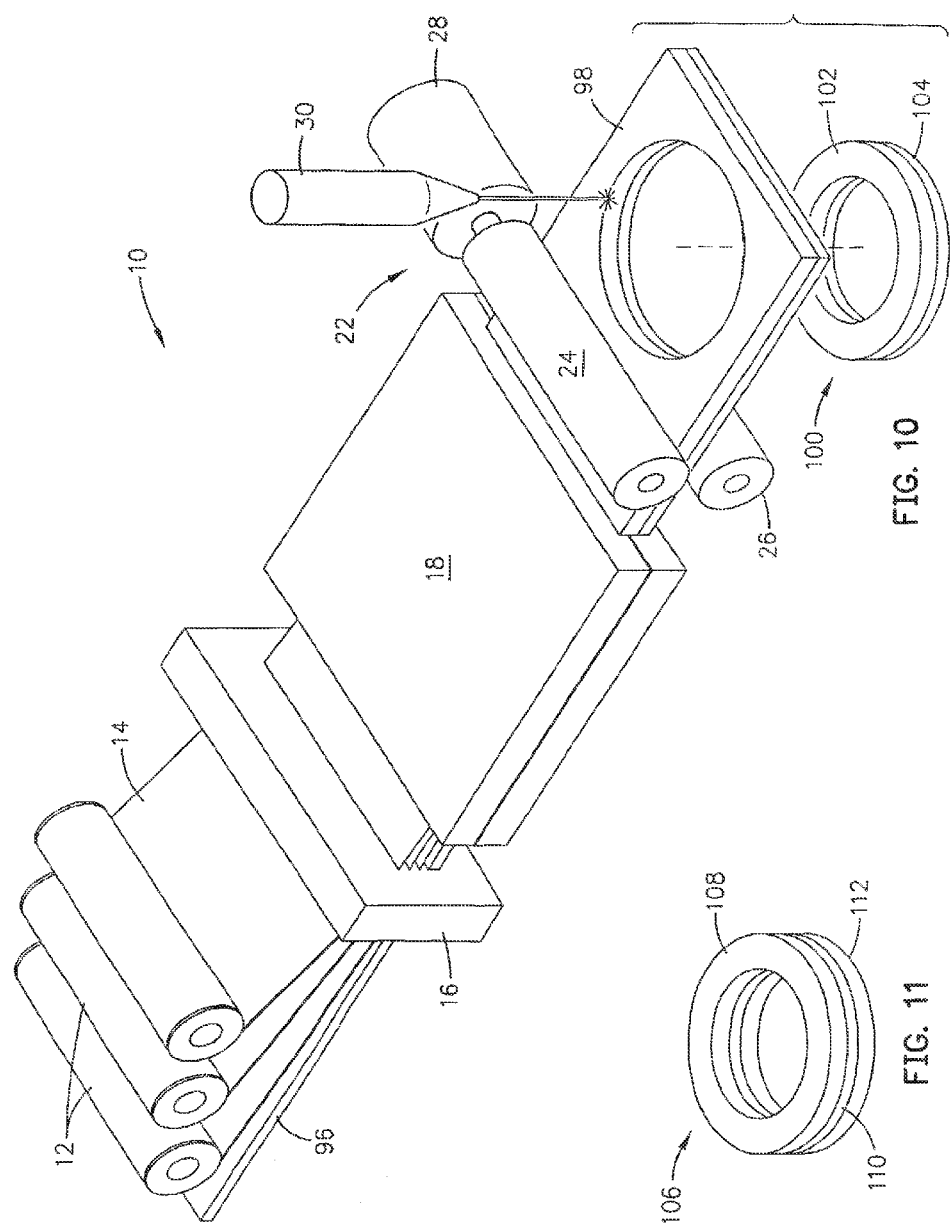
FIG. 10 is a perspective view schematically illustrating an apparatus and a preferred method of including a secondary material to provide an integral backing or reinforcement portion toward carrying out the invention.
FIG. 11 is a perspective view illustrating one product produced in accordance with the invention.

Referring to FIG. 10 of the drawing, there is schematically illustrated another method for carrying out an exemplary series of steps of producing products such as friction linings for brakes and clutches in accordance with the invention. The method is carried out in the substantially the same system, designated generally by the numeral 10, as previously described. The system comprises source of reinforcing fiber or fabric such as one or more spools or rolls 12 from which a panel 14 of a plurality of strands of an elongated continuous fiber or arrays of fiber are drawn. The panels or arrays of fibers are impregnated with a suitable resin such as by being passed through suitable injection chamber or wetting bath 16 of a suitable resin such as a phenolic resin and through a forming die 18 from which a composite panel 20 emerges. A backing or reinforcing panel 96 of metal or other suitable substantially rigid material is passed through the system with the resin impregnated fabric panels and is bonded thereto. The composite fabric panel and resin forms a top layer bonded to the backing panel emerging from the pultrusion apparatus or system. The composite panel 98 may then be cut into the appropriate shaped units 100 having a combined friction surface 102 and backing surface 104. This forms a unit that may be used for brake or clutch rotors or other friction devices. The backing material may be any suitable material such as solid metal panel, perforated metal panel, metal screen, composites and the like. This process can eliminate the additional step of bonding.

Reinforcing panel 96 may be made of metal or other suitable substantially rigid materials. In the context of the disclosed device, a substantially rigid material has mechanical properties sufficient to provide additional stiffness or reinforcement to the device so as to impede undesirable flexing. Substantially rigid materials, as the term is used herein, have a tensile strength higher than 18,000 $lb/in^2$, and in more particular implementations between the range of 18,000 $lb/in^2$ to 290,000 $lb/in^2$. Some examples of substantially rigid materials include cast iron (18,000 $lb/in^2$), and steel, as well as other similar materials with similar strengths such as but not limited to titanium, aluminum, and metal and non-metal composites. Particular examples which fall in the middle of the acceptable range include, but are not limited to, drawn annealed steel SAE 4340 (290,000 $lb/in^2$), SAE 1300 steel (100,000 $lb/in^2$ to 240,000 $lb/in^2$), and titanium alloy 6-4 (130,000 $lb/in^2$). Those of ordinary skill in the art may describe tensile strength near the higher end of this range as rigid, in which case the reinforcing panel 96 would be referred to as a rigid panel or a substantially rigid panel. If the panel is made of metal or includes a metal or a metal alloy, the panel would be called a rigid metal panel or a substantially rigid metal panel.

Additionally, particular implementations of the disclosed device may not include a rigid backing panel in addition to the resin impregnated panels because the long fiber reinforced polymer (LFRP) composites may have similar tensile strength to steel.

One a particular composite unit is formed with an aluminum backing for producing brake rotors of light weight with a durable friction surface. The rotor may be detachably attached to a hub of an automobile to provide a reduction in the un-sprung weight of an auto suspension and wheel assembly. In an alternate method the substantially rigid core or panel may be sandwiched between fabric panels to produce a panel having opposed friction faces as illustrated in FIG. 11. As illustrated a unit 106 having a composite face 108 on one side of a substantially rigid panel 110 and a composite face 112 on the other side. These units can be used as clutch or brake rotors or other friction devices.

Figure 12:
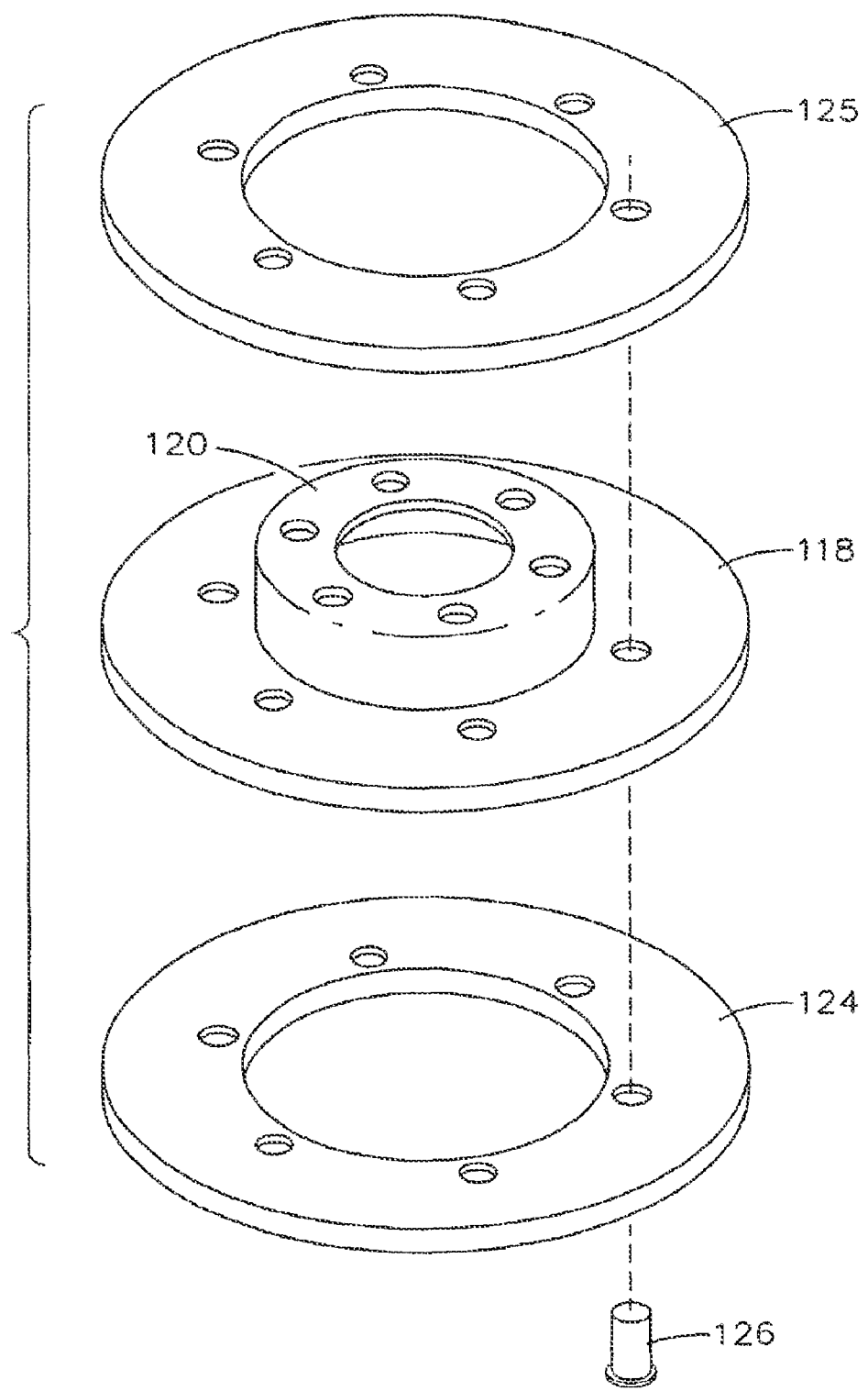
FIG. 12 is a perspective view illustrating another product produced in accordance with the invention.

Referring to FIG. 12, there is illustrated an embodiment wherein a laminate brake rotor comprises a central lightweight disc 118 having a hub 120 for detachable attachment to an axle hub of a vehicle. A pair of composite rotor discs 122 and 124 are attachable to the central disc to provide the friction surface for engagement by brake pads. This construction enables the use of light weight material such as aluminum for the central hub 118 to reduce the un-sprung weight of an auto suspension. Aluminum has been found not suitable for traditional brake rotors because it lacks sufficient hardness.

The manufacturing system and process, as illustrated and described herein, provides for the controlled predetermined orientation of the primary fibers, as well as the controlled predetermined uniformity and density of the primary fibers within the resin matrix. For example, the composition of the friction device determines many of its characteristics, such as its durability, heat resistance, and friction resistance. With this process, the primary fibers may be controllably distributed and oriented uniformly at any suitable angle to the friction surface of the brake pad or friction device. Thus, the process and materials have the capability of providing superior, predictable and consistent performance.

Milled or chopped fibers such as glass, ceramic kevlar steel, wool or cotton fibers or other may also be added and introduced into the matrix material so that they are picked up by the primary strands of fibers as they pass through the resin. The chopped fibers may be in the range of from 1% to about 5% by weight of the matrix material. The short fibers are preferably in the approximate range of 0.015 inch to about 0.062 inch and dispersed somewhat uniformly throughout the matrix. This dispersement of milled fibers provides multi-axis mechanical reinforcement, as well as crack and compression resistance in areas to be machined for mounting purposes. In this process, milled or chopped fibers may be mixed in the primary resin reservoir, or in the alternative two reservoirs of resin may be used. In one arrangement a first tank contains a low viscosity resin to enhance the wetting of the fibers (preferably predominately glass fibers) as they are passed through. The fibers then pass through a second tank of higher viscosity resin containing many of the fillers and chopped wool, cotton or other fibers. The chopped fibers preferably make up from about 1% to 5% of the reinforcement fibers. They will be picked up by the primary strands of fibers and will generally extend transverse to the primary fibers with proper modification of the handling equipment. Other fibers may also be used in this way. These and the transverse fibers may be used together or in the alternative to achieve the desired shear strength. Alternatively a variation of woven or striated layers may utilized to provide desired changes in mechanical properties as may be required in the areas to be machined for mounting purposes including the use of secondary panels or cure composite metal or other types of material used as an integral backing or reinforcement to the pultruded composite.

The matrix material may be any suitable resin that is either a thermoplastic material or non-thermoplastic material, and it may require various forms of curing. It may be cured, for example, by cooling, heating, or by the use of UV or other radiation or the like. However, the materials must be capable of enabling the forming of the units by the pultrusion process.

One suitable phenolic resin is available from BP Chemicals under the trademark "CELLOBOND" and product designation J2041 L. This product is described as a high viscosity phenolic for use in heat cured pultrusion, does not require any catalyst and will provide reasonably fast line speeds and cure cycles. Another suitable phenolic resin is Borden 429C available from the Borden Company and recently improved variation thereof. These resins may be present in the range of from about 30% to about 60% and provide enhanced efficiency in production. In some cases, the manufactured unit must be post cured to assure the best performance. For example, it may be baked at about 250-500 degrees Fahrenheit for one or to several hours. Preheating may also be required for larger cross sectional units. This may be taken care of in any suitable manner, such as by use of an RF oven or radiant heat system and usually requires low temperature from about 80 to 150 degrees Fahrenheit.

Another resin that is preferably added or combined with one of the above is resorcinol-modified phenolic resin available under the trademark Rescorciphen developed by IND-SPEC Chemical Corporation. This resin is preferably present in the range of from about 0% to about 20% and preferably up to about 13.8% by weight. The resin may require the addition of material such as BYK 9010 in an amount of up to about 2.5% weight to control the viscosity of the mixture. The matrix material will be formulated to include heat dissipation and/or friction modifiers, such as graphite and/or non-ferrous metallic powders and/or the like. For example, from about one to ten percent by weight of one or more fillers and/or modifiers, such as graphite powder and/or one or more non-ferrous metallic powders, may be incorporated into the matrix material. Other materials include but are not limited to mineral filler, rubber powder, copper powder, ceramic powder, nut shell flour (such as walnut or cashew). These may each be in the amount of one percent (1%) to ten percent (10%) and preferably in the amount of 3% to 5% by weight. Nut flour has been found to increase the shear strength of the unit and to enhance the fade characteristics of pads or linings. During braking, heat breaks down the nut shell flour causing nut shell oil to combine chemically with the resin polymer molecule in a process known as chain branching. Thereby, the polymer becomes stronger and more able to withstand high temperatures that contribute to brake fade. The ceramic powder is preferably in the form of hollow spheres of about seven to ten microns. These have been found to serve as a mechanical lubricant in the pultrusion process and to enhance the hardness and wear characteristics of the friction units.

A preferred formulation of matrix materials includes a wetting agent in the amount of about 0.0 to 2.5%, Barytes (BaS04) of about 0.0 to 10%, Copper of about 0.0. to 20%, walnut flour of about 0 to 5.0%, Talc Nytal (CaMgSilicateIH20) of about 0.0 to 5.0%, graphite of about 0.0 to 5.0%, Zinc Oxide (friction enhancer) of about 0.0 to 10%, Aluminum Oxide (friction enhancer) of about 0.0 to 10%, brass (friction enhancer) of about 0.0 to 10%, and a mold release agent of about 0.0 to 2.5%.

The following examples are intended to illustrate but not limit the invention. While these examples are typical of formulations that have been found to be satisfactory, other formulations will occur to those of skill in the art and may be used.

Example 1

A suitable test sample of the product was produced having the composition of a wetting agent of about 0.035%, Barytes (BaS04) of about 5.5%, Copper of about 6.9%, walnut flour of about 2.8%, Talc Nytal (CaMgSilicateIH20) of about 2.8%, graphite of about 3.5%, Zinc Oxide (friction enhancer) of about 4.1%, Aluminum Oxide (friction enhancer) of about 4.1% and Axel 1850 (mold release) of about 0.7%. The final product had about 46.0 wt % glass, about 30.30 wt % filler and about 33.7 wt % resin. The glass was PPG E type phenolic sized woven fabric.

Example 2

| Raw Material | Weight Percent |
| --- | --- |
| Phenolic Resin | 12.66 |
| Barium Sulfate | 15.19 |
| Potassium Titanate | 12.66 |
| Kevlar | 2.53 |
| Calcium Fluoride | 5.06 |
| Antimony Trisulfid | 2.53 |
| Zircon | 2.53 |
| Aluminum Oxide | 1.27 |
| Syn Graphite | 7.59 |
| Coke 9 | 2.53 |
| Cashew Particles | 7.59 |
| Rubber | 5.06 |
| Calcium Oxide | 1.27 |
| Ceramic Fiber | 3.80 |
| Vermiculite | 10.13 |
| Copper | 7.59 |

Example 3

| Raw Material | Weight Percent |
| --- | --- |
| Phenolic Resin | 10.53 |
| Barium Sulfate | 18.42 |
| Steel Wool 205 | 21.05 |
| Kevlar | 0.00 |
| Calcium Fluoride | 5.26 |
| Zinc Sulfide | 2.63 |
| Zircon | 3.95 |
| Aluminum Oxide | 1.32 |
| Syn Graphite | 7.89 |
| Coke 9 | 2.63 |
| Cashew Particles | 2.63 |
| Rubber | 5.26 |
| Calcium Oxide | 1.32 |
| Ceramic Fiber | 3.95 |
| Vermiculite | 10.53 |
| Copper | 2.63 |

Example 4

| Raw Material | Weight Percent |
| --- | --- |
| Phenolic Resin | 8.33 |
| Barium Sulfate | 16.67 |
| Steel Wool 205 | 38.86 |
| Iron Sponge | 15.63 |
| Interfibe 230 | 2.08 |
| Zinc Sulfide | 2.08 |
| Blank | 0.00 |
| Aluminum Oxide | 0.00 |
| Graphite A 505 | 6.25 |
| Coke 9 | 2.08 |
| Cashew Particles | 2.08 |
| Rubber | 4.17 |
| Vermiculite | 4.17 |

The resins may be aqueous based and contain compounds or additives known as molecular sieves to reduce by containment free by products which may cause excessive voids in the product. Suitable such molecular sieve materials are available as both sodium activated and hydrated chabazite in several mesh sizes. These products absorb gases and water, reduce potential voids or cracks due to gases and vapor. The typical chemical names are sodium alumino silicate and calcium alumino silicate. These are in powder form and may be added in amounts of from about 1% to about 5% by weight of resin. Another additive which has shown to reduce the amount of water vapor formed during the process is barium sulfate (BaS04) commonly referred to as barite.

The resins may also be non-aqueous based which would eliminate or reduce the need for molecular sieves. The resin may also be low condensation resin which produces less water by products.

The fiber to resin matrix may vary from about one part fiber to two part resin, up to about three part fiber to one part resin. A preferred fiber to matrix composition is from about 35% to 75% fiber to 25% to 40% resin or matrix mix. The matrix preferably has from 5% to 10% by weight of one or more of graphite powder, copper powder, aluminum powder and the aforementioned powders. In addition, aramid pulp and other synthetic fiber pulps may be added or distributed throughout the matrix material. Other materials such as 3 formulation sheets can be added as required.

Certain thermoplastic materials may be desirable for other specific applications. The thermoplastic material may, for example, be a suitable polyester and may also have components such as powders of graphite or other material to aid in friction control and the dissipation of heat. For example, a one to about ten percent by weight of graphite powder uniformly distributed throughout the thermoplastic material aids in the dissipation of heat. Alternate compositions may include small amounts of other materials, such as non-ferrous metallic powders, such as copper, aluminum or the like. For example, a one to ten percent by weight copper powder may also be utilized to enhance the dissipation of heat. Thus, the composition must be compatible with the pultrusion process and at the same time provide satisfactory friction units.

I have discovered that various proportions and compositions of materials can affect the pultrusion process as well as the performance characteristics of the brake pad and lining units. For example, many test samples with many ranges of examples of compositions have been constructed and tested in order to optimize friction units. In recent tests one of the most suitable formulation was found to be wetting agent about 0.035%, BaS04 about 5.5%, Copper about 6.9%, walnut flour about 2.8%, Talc Nytal (CaMgSilicatelH20) about 2.8%, graphite about 3.5%, Zinc Oxide (friction enhancer) about 4.1%, Aluminum Oxide (friction enhancer) about 4.1% and mold release agent about 0.7%. The final product had about 46.0 wt % glass, about 30.30 wt % filler and about 33.7 wt % resin. The fiberglass was PPG "E" type with phenolic compatible sizing woven into fabric.

While I have illustrated and described my invention by means of specific embodiments, it is to be understood that numerous changes and modifications may be made therein without departing from the spirit and the scope of the invention as shown in the appended claims.

The invention claimed is:

1. A continuous process for manufacturing composite friction units comprising:
    selecting a panel of substantially uniform array of predominately glass strands of primary reinforcing fibers, the array of fibers bound together in a form selected from the group consisting of woven, braided and stitched;
    wetting the array of primary reinforcing fibers with a phenolic resin material;
    pulling the wetted array of reinforcing fibers in a predetermined uniform distribution and orientation through a composite forming die for forming a body having at least a part of a peripheral configuration of the friction units;
    while pulling the wetted array of reinforcing fibers, simultaneously pulling a substantially rigid panel having a tensile strength of at least about 18,000 lb/in$^2$ through the forming die with the panel of primary reinforcing fibers forming a layer bonded to a top surface of the substantially rigid panel emerging from the forming die;
    solidifying the body by curing the resin; and
    selectively cutting the body at least along one path transverse to the strands into a plurality of the friction units each having a predetermined size and configuration and uniform distribution and alignment of fibers throughout.

2. The process of claim 1, wherein the resin contains about 0.035% wetting agent, about 5.5% barytes, about 6.9% copper, about 2.8% walnut flour, about 2.8% talc, about 3.5% graphite, about 4.1% zinc oxide, about 4.1% aluminum oxide, and about 0.7% mold release agent.

3. The process of claim 1, wherein the friction unit contains about 46.0 wt % glass, about 30.30 wt % filler and about 33.7 wt % resin.

4. The process of claim 1, wherein said primary reinforcing fibers are under tension in said body.

5. The process of claim 1, wherein the primary reinforcing fibers are under tension in the body.

6. The process of claim 1, wherein wetting said array of primary reinforcing fibers with a phenolic resin material comprises selecting the array as pre-impregnated fibers.

7. The process of claim 1, wherein selecting a substantially rigid panel includes selecting a mesh panel.

8. The process of claim 1, wherein selecting a substantially rigid panel includes selecting a perforated panel.

9. A continuous process for manufacturing composite friction units comprising:
    selecting a panel of substantially uniform array of predominately glass strands of primary reinforcing fibers, the array of fibers bound together in a form selected from the group consisting of woven, braided and stitched;
    wetting the array of primary reinforcing fibers with a phenolic resin material;
    pulling the wetted array of reinforcing fibers in a predetermined uniform distribution and orientation through a composite forming die for forming a body having at least a part of a peripheral configuration of the friction units;
    selecting and pulling a substantially rigid metal panel having a tensile strength of at least 18,000 lb/in$^2$ through the forming die simultaneous with the panel of primary reinforcing fibers;
    solidifying the body by curing said resin; and
    selectively cutting the body at least along one path transverse to the strands into a plurality of the friction units each having a predetermined size and configuration and uniform distribution and alignment of fibers throughout.

10. The method of claim 9, wherein the substantially rigid metal panel comprises a solid metal plate or a perforated metal plate.

* * * * *